United States Patent [19]

Lequeux

[11] Patent Number: 5,307,842
[45] Date of Patent: May 3, 1994

[54] FLEXIBLE CONDUIT WITH IMPROVED THERMAL PROTECTION COMPRISING CORK

[75] Inventor: Jean-Michel Lequeux, Le Vésinet, France

[73] Assignee: Coflexip, France

[21] Appl. No.: 920,452

[22] PCT Filed: Dec. 20, 1991

[86] PCT No.: PCT/FR91/01045

§ 371 Date: Aug. 20, 1992

§ 102(e) Date: Aug. 20, 1992

[87] PCT Pub. No.: WO92/11487

PCT Pub. Date: Jul. 9, 1992

[30] Foreign Application Priority Data

Dec. 21, 1990 [FR] France ................................ 90 16086

[51] Int. Cl.[5] .............................................. F16L 9/14
[52] U.S. Cl. .................................... 138/149; 138/137; 138/172; 138/174; 138/177; 138/130
[58] Field of Search ............... 138/137, 118, 130, 129, 138/132, 134, 172, 144, 177, DIG. 8, 149, 151, 174

[56] References Cited

U.S. PATENT DOCUMENTS

| | | | |
|---|---|---|---|
| 1,943,215 | 1/1934 | Dunlap | 138/137 |
| 2,377,317 | 6/1945 | Blume | 138/149 |
| 2,405,330 | 8/1946 | Ryder | 138/149 |
| 3,537,486 | 11/1970 | Hullhorst | 138/149 |
| 3,554,237 | 1/1971 | Pelley et al. | 138/149 |
| 3,563,825 | 2/1971 | Segura et al. | 138/149 |
| 3,628,572 | 12/1971 | Shannon | 138/149 |
| 3,853,149 | 12/1974 | Stine | 138/149 |
| 3,929,167 | 12/1975 | Bickel | 138/151 |
| 4,157,101 | 6/1979 | Ross | |
| 4,239,064 | 12/1980 | Gilman | 138/149 |
| 4,590,971 | 5/1986 | Webster et al. | 138/149 |
| 4,942,903 | 7/1990 | Jacobsen | 138/137 |

FOREIGN PATENT DOCUMENTS

| | | | |
|---|---|---|---|
| 2558847 | 7/1977 | Fed. Rep. of Germany . | |
| 6810856 | 5/1969 | Netherlands . | |
| 15542 | of 1898 | United Kingdom | 138/149 |
| 2031103 | 4/1980 | United Kingdom . | |
| 2180032 | 3/1987 | United Kingdom . | |

Primary Examiner—James E. Bryant, III
Attorney, Agent, or Firm—Ostrolenk, Faber, Gerb & Soffen

[57] ABSTRACT

A flexible pipe with improved thermal protection in which a fluid is liable to flow under pressure and comprising at least one tightness sheath or tube of polymeric material, at least one reinforcement therein further comprises as thermal protection, a sheath of composite material comprising cork granules and a flexible metal tube which is disposed outside said sheath of composite material. Application notably to flexible pipes for oil installations.

18 Claims, 1 Drawing Sheet

FLEXIBLE CONDUIT WITH IMPROVED THERMAL PROTECTION COMPRISING CORK

BACKGROUND OF THE INVENTION

1. Field of the Invention

This invention relates to a flexible pipe with improved thermal protection and, more particularly, to flexible pipes in which a fluid flows under high pressure, such as e.g. those used in shore-based and offshore installations for exploration and production of hydrocarbon deposits.

2. Description of the Prior Art

When such flexible pipes are installed in high fire risk areas, such as drilling platforms, or when they are connected to production, linking, control and/or safety means of parts of oil installations, deterioration due to sudden and/or sustained increase in ambient temperature can lead to very serious accidents for both staff and the other parts of the installation in the vicinity of the deteriorated flexible pipes.

Firstly, it should be noted that the diameters of flexible pipes concerned by this invention can vary between approximately 2.5 and 30 cm, and that the pressure circulating inside the flexible pipes can reach 1,000 bars and more.

Under these conditions, any leakage whatsoever of these flexible pipes, especially due to local outbreak of fire, can understandably entail severe consequences. It is for this reason that efforts have always been made to preserve the the event of a fire, in order to enable the rate of flow of the fluid to be maintained without leakage at working pressure until flow stoppage operations have been carried out, or for as long as it takes to bring the fire under control.

Though there are no specific standards in existence, it is recommended to proceed in such a way that the flexible pipes resist for 30 minutes when subjected to an ambient temperature of 700° C.

The flexible pipes used in the above-mentioned applications, which are not in any way restrictive, generally comprise at least one tight sheath and at least one armour layer. The flexible pipes in question typically include at least one layer of reinforcement comprising metal wires, where the cross-section of the wires may take any shape. Flexible pipes often comprise two sheaths, an external sheath surrounding the reinforcement windings, and the other sheath being inside said armour layer, depending on the specific utilizations of said flexible pipes. Certain flexible pipes also comprise a third, intermediate, sheath disposed between two armour layers.

Furthermore, the flexible pipes in question are commonly fitted with an outer protection consisting of a metal strip wound into a low-pitch helix; the strip is e.g. comprised of an interlocking profiled strip. However, it is important to note that this strip was not at all for thermal protection purposes but was simply intended to protect the flexible pipe against surrounding mechanical attacks such as friction and/or crushing. Under these conditions, when the flexible pipe is subjected to the heat from a fire, the plastic sheath(s) have been observed to begin to melt. It is the external sheath that melts first, and then, due to heat conduction phenomena between the elements constituting the flexible pipe, since the heat conductivity of the metal wire windings is very high, it is the internal sheath which gradually softens. When it softens, the internal sheath, which is designed to act as a tightness barrier, is penetrated by extrusion, under the effects of the internal pressure of the fluid, through gaps in the reinforcement, to finally create a leak and enable the fluid to gush out of the pipe.

In the case of thermoplastic materials usually used to manufacture external and internal sheaths, the melting point is between 130° C. and 200° C. Admittedly, the metal strip delays the destruction and/or softening of the sheaths, but cannot prevent this occurring when the temperature is high.

In UK patent application No. 2,180,032, there is described a steel pipe fitted with a thermally insulating layer composed of a relatively thick layer of a mixture of cork and rubber granules. The steel pipe is intended for immersion in sea water and the purpose of the thermal layer is to reduce thermal dissipation towards peripheral layers of the fluid flowing in the steel pipe, in order to obtain, at exit of the steel pipe, a fluid at a suitable temperature.

This invention aims to improve the protection of flexible pipes in or near an area with a prevailingly high temperature liable to modify the mechanical and/or physical properties of at least certain component elements of said flexible pipes.

OBJECT OF THE INVENTION

The main object of this invention is to remedy the preceding disadvantages, and particularly to provide a flexible pipe with improved thermal protection in which a fluid can flow under pressure and comprising at least one reinforcement, at least one sheath of polymeric material inside or outside said reinforcement, wherein it further comprises a thermal protection consisting of a sheath of a composite material comprising cork granules and a flexible metal tube which is disposed outside said sheath of composite material.

SUMMARY OF THE INVENTION

Accordingly, the thermal barrier thus created around the flexible pipe enables the latter to withstand temperatures of 700° C. and more for a duration of at least 30 minutes which, in the present state of the art, is deemed sufficient to at least stop the flow of fluid in these flexible pipes if the fire cannot be brought under control within this period of time.

Advantageously at least one armour layer is disposed between an internal tightness sheath and an external sheath, the protective cover is disposed above said outer sheath.

The performance of the flexible pipe as regards its behavior in high temperatures have been observed to have been improved substantially by the outer metal layer constituted by an external flexible metal tube. Preferably, the metal tube has good heat reflection qualities. In this way, the heat liable to be transmitted notably to the outer sheath of the flexible pipe, which can be one of the first component element to be reached, is partially reflected by the external metal tube. The temperature gradually decreases as the heat overcomes the successive obstacles, prior to reaching the outer sheath.

BRIEF DESCRIPTION OF THE DRAWINGS

Further features and advantages of the invention will be apparent from the following particular description of several preferred embodiments of this invention as illustrated in the corresponding accompanying drawings in which.

DESCRIPTION OF THE PREFERRED EMBODIMENTS

Figure 1:
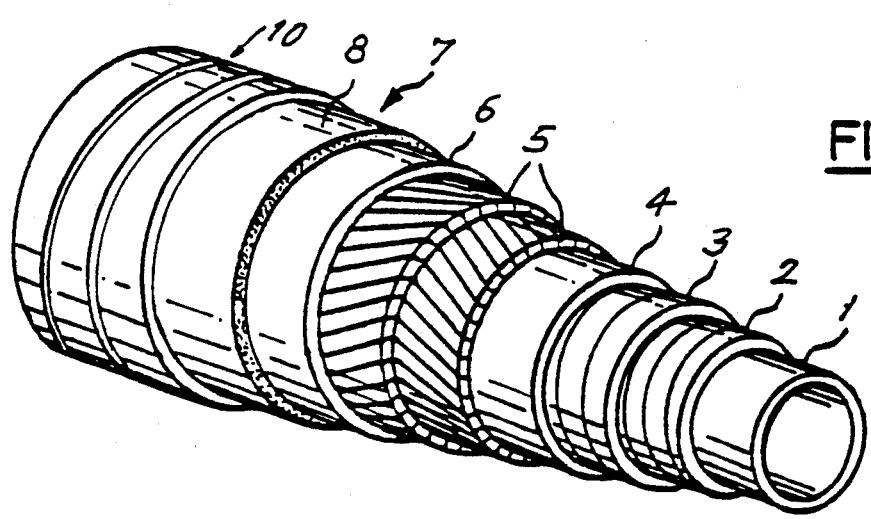
FIG. 1 is a partially exploded perspective view of a first method embodying the invention.

A flexible pipe as shown in FIG. 1 comprises a tight internal polymeric tube or sheath 1 preferably manufactured in a thermoplastic material such as polyamide, polythene, PVDF or other suitable material, one or two internal carcasses 2 or 3 resisting the internal pressure of the pipe and composed of a metal wire or strip wound into a helix, an intermediate sheath 4 of the same thermoplastic material as the inner tube 1 or of another material, at least one armour layer each composed of two wire windings 5 with an armouring angle or angle of inclination of the wires on the longitudinal axis of the flexible pipe of less than or equal to 55°, and an outer sheath 6 of thermoplastic material. The armouring angle of the wires of a winding 5 may vary from one winding to another, and the wires may be crossed from one winding to another, as is usually the case. The structure and type of the component elements of the flexible pipe are selected as a function of the conditions of use of said flexible pipe. Likewise, the material of the outer sheath 6 may be identical or different to that of the inner tightness sheath 4. As a variation of FIG. 1, the thermal protection embodying the invention can also be used to advantage in the case of a flexible pipe comprising an inner sheath 1, one or two carcasses 2 or 3, at least one armour layer 5 and one outer sheath 6, but no intermediate sheath 4.

It should be noted that the invention also applies to rough-bore tubes comprising, inside the inner tightness sheath 1, an inner carcass composed of a metal section wound at low pitch and preferably in the form of an interlocking strip.

According to the invention, a thermal protection cover 7 is disposed over the flexible pipe, the former having a thickness equal to or greater than 2 mm and which, in FIG. 1, is in the shape of a sleeve tube 8 and is manufactured in a composite material comprising cork granules. Preferably, the composite material is comprised of cork granules agglomerated with a plastic binding agent.

Better still, cork granules of 1 to 2-mm diameter are immersed in a matrix of flame resisting material, particularly elastomeric, such as a polymer containing a halogen, chloride among others, and, if required, addition of a flame resisting agent such as antimony trioxide or hydrous aluminum oxide. Among the polymers that can make up the matrix, mention can be made of the chlorosulfonated elastomeric polymers, or, the particularly advantageous chloroprene rubber (neoprene). As the composition comprising the cork granules and the polymer is completed by various additives such as vulcanizing agent, vulcanization accelerator, anti-heat agent, a plasticizer (lamp oil), a coloring agent, it is possible, using well known production methods, to manufacture a composite material comprising cork granules and having a certain mechanical strength, this material having been proved suitable to constitute the thermal protection cover. Interesting results are obtained with materials of average density in the region of 500 to 800 kg/m$^3$, and advantageously around 650 to 700 kg/m$^3$, the average thermal conductivity of such a composite material being equal to or less than approximately 0.3 W/m.° C; e.g. in the region of 0.2 W/m.° C.

It goes without saying that the density of the composite thus obtained depends on the percentage of cork in the chloroprene rubber, said percentage also depending on the structure of the flexible pipe to be protected and/or the conditions of use and the temperature that said flexible pipe must withstand.

Figure 2:
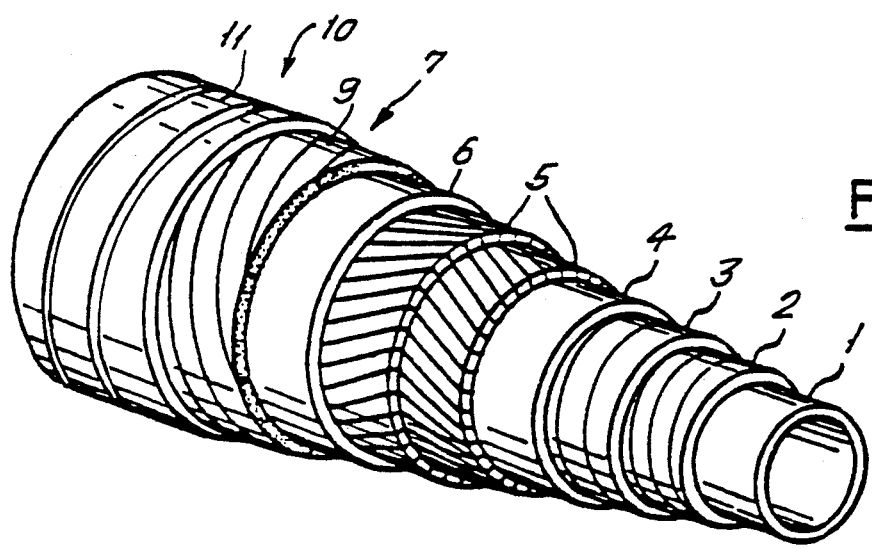
FIG. 2 is a partially exploded perspective view of a second method embodying the invention.

As shown in FIG. 2, the sheath 7 can advantageously be constituted by the winding of a strip 9, approximately 6 mm thick, whose whorls can be either contiguous or disjointed, preferably slightly out-of-joint or overlapping one another, the width of the lap of one whorl over another being e.g. slightly less than half the width of the strip. Good results are obtained with a 4 to 8-mm thick strip, especially when the interior diameter of the flexible pipe is included between 30 and 150 mm, which corresponds typically to certain interesting applications of the invention; however, the thickness can also be as high as, and even exceed, 10 mm, depending on the characteristics of the flexible pipe and the conditions of use. By means of a machine of a well known type such as a wrapping machine, the protective cover 7 of a flexible pipe can thus be easily and inexpensively made by wrapping a previously made strip in a composite material comprising cork granules, in particular a material having a tensile strength equal to or greater than approximately 1 daN/cm$^2$, preferably to approximately 5 daN/cm$^2$, and capable of withstanding an elongation of e.g. 10% to 20%.

Advantageously, the strip 9 is vulcanized before being wound onto the flexible pipe. Such a strip conforms with standard BS AU 120 and with ASTM standards F 104 and F 36.

Alternatively, when the cover is in the shape of the sleeve tube 8 illustrated in FIG. 1, it can be constituted by one or plural sleeve tubes slipped onto the flexible pipe, or by shells, e.g. by pairs of half-shells, where each shell might be comprised of at least two elements each covering one sector of the circular contour of the outer sheath 6. The sleeve tube 8 can also be installed continuously over a considerable length by extrusion of a mixture of cork granules and elastomer with various appropriate additives, the extrusion operation being performed in a known manner with a crosshead extruder around the core constituted by the flexible pipe covered by the outer sheath 6, and possibly followed by a vulcanizing of the elastomer.

The assembly comprised by the flexible pipe and the protective cover 7 (such as sleeve tube 8 or the winding constituted by the winding of strips 9) is covered by a external flexible metal tube 10 which completes the thermal protection and it is constituted by the winding of a metal strip 11 having the particularity of having good heat reflectivity, such as a stainless steel, e.g. of the austenitic type. Said metal strip can be a simple continuous strip of limited width, wound flat, or a strip profiled so as to have a flattened S configuration in order that the adjacent whorls might overlap one another.

Preferably, the metal strip has an interlocking section with radial relief enabling the relative displacement of the whorls over the length of the pipe to be restricted. In particular, the metal strip can be manufactured in the known form of an interlocked strip as disclosed e.g. in French patent No. 2,555,920. Alternatively, the outer metal tube can be made in the form of a corrugated tube.

Figure 3:
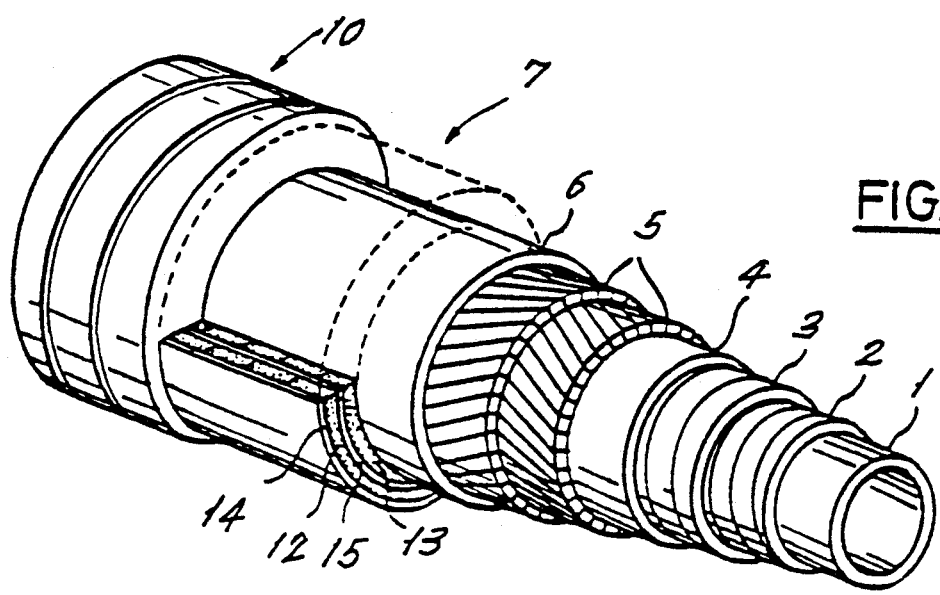
FIG. 3 is a partially exploded and cut away perspective view of a third method embodying the invention.

In a particular form of embodiment shown in FIG. 3, the flexible pipe comprises, between the outer tube 10 and the outer sheath 6, two wound strips made from agglomerated cork 12 and 13 and at least one and preferably two adhesive tapes 14 and 15 that can be reinforced, if required, by glass fiber or any other equivalent material, tape 15 being laid between cork bands 12 and 13.

Tests were conducted on a flexible pipe, the assembly having the following structure from the inside to the outside:

- an internal tightness tube 1 of polyamide with an internal diameter of 76 mm and a thickness of 6 mm,
- a pressure vault 2 of steel wire of the interlocking low-pitch type,
- a reinforcing pressure vault of flat steel wire 3, with a low-pitch helix,
- an intermediate sheath 4 of polyethylene with a thickness of 2 mm,
- two reinforcement wire windings 5 of steel wire disposed symmetrically with an armouring angle at 35°,
- an adhesive tape (not represented) wound around the outer winding 5,
- an outer sheath 6 of polyethylene with a thickness of 5 mm,
- a thermal protection cover 7 of agglomerated cork with a thickness of 6 mm,
- an outer tube 10 of interlocking strips in stainless steel of the austenitic AISI 304 type.

In the case of the flexible pipe subjected to the test, the thermal protection cover was constituted by a layer of a strip 9 in agglomerated cork and rubber chloroprene with the following characteristics:

size of the cork granules 1 to 2 mm, average density approximately 660 to 670 kg/m$^3$, thermal conductivity in the region of 0.2 W/m. °C., tensile strength in the region of 10 daN/cm$^2$ (1 MPa).

The strip had a thickness of 6 mm and a width of 60 mm, and was wound into a single layer of more or less contiguous whorls over a diameter of 140 mm corresponding to the outside diameter of the outer sheath 6.

As an end fitting had been fitted to each end of a section sampled off a pipe produced over considerable length, the 5.5-m long flexible pipe thus made was similar to the pipes commonly used without the additional layer of thermal protection.

The above flexible pipe was subjected to a fire resistance test under the following conditions:

The flexible pipe was:
1. sealed at both ends by blind flanges and metal seals,
2. filled with water at a pressure of 1040 bars,
3. one of the ends which was directly exposed to the fire was protected by a sheet metal cap covering an insulation made of refractory fibers CERABLANKET (®) from MANVILLE.

A 3-m length of the flexible pipe was then exposed to a temperature of 700° C., reached in 5 minutes, and then held steady at 700° C. throughout the oven heating operation which lasted a total of 80 minutes. The pressure of the water in the flexible pipe having been maintained constantly equal to 1040 bars throughout the entire duration of the test, the heating of the oven was interrupted after 80 minutes without any leakage whatsoever having been observed.

The results showed that the temperature of the water did not exceed 140° C., which is well below the melting point (183° C.) of the polyamide constituting the inner tightness sheath.

The positive result thus obtained, which exceeded expectations by far, may seem astonishing, particularly when one considers that the overall coefficient of thermal insulation of the flexible pipe had been increased relatively little by the addition of the thermal protection cover, since the thickness and the coefficient of thermal conductivity of the cover are of the same order of magnitude as those of the three sheaths of the flexible pipe. The reason for the good result thus obtained probably lies in the behaviour in fire of the agglomerated cork which is better than that of the plastic materials constituting the sheaths. Indeed, though calcined, the agglomerated cork was found to have remained in position, forming a spacer between the outer tube in stainless steel and the reinforcement wires whereas the outer plastic sheath of the flexible pipe was substantially deteriorated, and thus preventing the emergence of a thermal bridging effect which would have considerably accelerated the rise in temperature of the inner plastic tightness sheath and of the water contained in the flexible pipe.

In the case of the example described hereinabove with regard to a flexible pipe subjected to the above-mentioned tests, the coefficient of thermal conduction per unit length (coefficient of thermal exchange per unit meter length of piping W/m and °K.) was found to be reduced by approximately 27% when a flexible pipe embodying the invention is compared with a same flexible hose not comprising a cork strip.

Furthermore, the metal tube was found to serve to avoid localized hot spots since it spreads the heat all around the flexible pipe and, in particular, around the thermal cover which is thus exposed over its entire surface to a substantially even temperature.

It further appears that the combination of the protective cover in agglomerated cork and the external flexible metal tube produces a synergetic effect that results in increased protection of the flexible pipe against high temperatures. Indeed, in the event of a fire, in addition to its protective own effect through reflection of heat, the external flexible metal tube enables the behaviour of the layer of agglomerated cork to be improved due to the fact that said agglomerated cork is in a confined space inside said metal tube.

It goes without saying that if the conditions of behavior at high temperatures and/or of duration of exposure to said temperatures were to become more severe than those indicated in the disclosure, it would then be possible to increase the thickness of the composite sheath, which can be up to several centimeters; the thermal protection and more especially the agglomerated cork continues to act as a spacer while providing a certain thermal insulation despite being in a calcined state.

Finally, it is possible to insert between the metal tube and the agglomerated cork a layer of material with very good behavior in fire, e.g. comprising refractory fibers, such as the material marketed under the CERABLANKET trademark.

What I claim is:
1. A flexible pipe with improved thermal protection in which a fluid can flow under pressure and comprising at least one tightness sheath or tube of polymeric mate- rial and at least one reinforcement, further comprises a thermal protection consisting of a sheath of composite material comprising cork granules agglomerated with a binding material and a flexible metal tube which is disposed outside said sheath of composite material, wherein the average density of said composite material is between 500 and 800 kg/m$^3$ and the thermal conductivity of said composite material is less than 0.3 W/m.°C.

2. The flexible pipe as claimed in claim 1, wherein said composite sheath is at least one strip wound helically over said reinforcement at a high angle with regard to the longitudinal axis of said flexible pipe.

3. The flexible pipe as claimed in claim 2, wherein the whorls of said helix are contiguous or slightly out-of-joint.

4. The flexible pipe as claimed in claim 2, wherein said whorls of said helix partially overlap one another.

5. The flexible pipe as claimed in claim 1, wherein said composite sheath is a cylindrical sleeve tube slipped over said reinforcement.

6. The flexible pipe as claimed in claim 1, wherein said composite sheath is an extruded directly over said reinforcement.

7. The flexible pipe as claimed in claim 1, wherein said composite sheath is composed of contiguous shells.

8. The flexible pipe as claimed in claim 1, wherein said thermal protection comprises at least two concentric layers of said composite material comprising cork granules.

9. A flexible pipe as claimed in claim 8, wherein at least one adhesive tape is interposed between said concentric layers.

10. The flexible pipe as claimed in claim 1, wherein a layer of material with very good behavior in fire is disposed between the metal tube and the composite sheath.

11. The flexible pipe as claimed in claim 1, wherein said composite material has a tensile strength of at least about 1 daN/cm$^2$ and complies with the standard BS AU 120 and ASTM F36 and F104.

12. The flexible pipe of claim 11, wherein said composite material has an elongation of 10–20%.

13. The flexible pipe of claim 12, wherein the average density of said composite material is about 650–700 kg/m$^3$, the thermal conductivity is about 0.02 W/m.°C. and the tensile strength is about 5 daN/cm$^2$.

14. The flexible pipe is claimed in claim 13, wherein the said cork granules have a diameter of 1 to 2 mm.

15. The flexible pipe is claimed in claim 13, in which said composite material has an average density of 660–670 kg/m$^3$, a tensile strength of 10 daN/cm$^2$ and wherein said sheath has a thickness of 4–8 mm and comprises cork granules agglomerated with chloroprene.

16. The flexible pipe is claimed in claim 1, in which the binding material is a polymer.

17. The flexible pipe as claimed in claim 1 having at least two reinforcement windings and having at least one outer sheath disposed between the said two reinforcement windings and said sheath of composite material.

18. The flexible pipe as claimed in claim 17, wherein said composite sheath is at least one strip of said material comprising cork granules, said strip being helically wound over said outer sheath at a high angle with regard to the longitudinal axis of said flexible pipe.

* * * * *